(12) United States Patent
Mertens et al.

(10) Patent No.: US 11,168,848 B2
(45) Date of Patent: Nov. 9, 2021

(54) HOLDING COLLIMATOR ELEMENTS IN A LIGHTING ARRANGEMENT

(71) Applicant: Lumileds LLC, San Jose, CA (US)

(72) Inventors: Juergen Mertens, Aachen (DE); Georg Henninger, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/857,535

(22) Filed: Apr. 24, 2020

(65) Prior Publication Data

US 2020/0340631 A1   Oct. 29, 2020

(30) Foreign Application Priority Data

Apr. 25, 2019  (EP) .................................... 19171105

(51) Int. Cl.
| | |
|---|---|
| *F21S 41/151* | (2018.01) |
| *F21K 9/69* | (2016.01) |
| *F21S 41/20* | (2018.01) |
| *F21K 9/90* | (2016.01) |
| *G02B 27/30* | (2006.01) |
| *F21Y 115/10* | (2016.01) |

(52) U.S. Cl.
CPC .................. *F21K 9/69* (2016.08); *F21K 9/90* (2013.01); *F21S 41/151* (2018.01); *F21S 41/285* (2018.01); *G02B 27/30* (2013.01); *F21Y 2115/10* (2016.08)

(58) Field of Classification Search
CPC .............. F21K 9/69; F21K 9/90; G02B 27/30
See application file for complete search history.

(56) References Cited

U.S. PATENT DOCUMENTS

| | | | |
|---|---|---|---|
| 10,793,057 B2* | 10/2020 | Stoehr ...................... | F21S 41/29 |
| 2013/0250598 A1* | 9/2013 | Lambert .................. | F21S 45/48 |
| | | | 362/520 |
| 2015/0085523 A1* | 3/2015 | Gurtl ...................... | F21S 41/153 |
| | | | 362/607 |
| 2015/0124469 A1* | 5/2015 | Krenn ................... | G02B 6/0008 |
| | | | 362/511 |
| 2015/0226395 A1* | 8/2015 | Taudt ..................... | F21S 41/265 |
| | | | 362/511 |
| 2016/0146419 A1* | 5/2016 | Reinprecht ........... | F21S 41/153 |
| | | | 362/512 |
| 2018/0128443 A1* | 5/2018 | Taudt ....................... | F21S 41/24 |
| 2018/0238510 A1* | 8/2018 | Gloss ..................... | F21S 41/285 |

(Continued)

FOREIGN PATENT DOCUMENTS

| | | |
|---|---|---|
| DE | 102017217902 A1 | 4/2019 |
| EP | 1396753 A1 | 3/2004 |

(Continued)

*Primary Examiner* — Zheng Song
(74) *Attorney, Agent, or Firm* — Servilla Whitney LLC

(57) ABSTRACT

A lighting arrangement includes a plurality of light sources in spaced arrangement. Collimator elements are arranged in front of the light sources. A holder with a plurality of spaced openings is provided to hold the collimator elements within the openings in such a way that the openings are arranged to contact the collimator elements from at least two opposed sides, In order to allow exact positioning and easy manufacturing, the holder comprises at least a first portion and a second portion such that at least some of the openings are formed between the first and the second portions.

13 Claims, 5 Drawing Sheets

(56) References Cited

U.S. PATENT DOCUMENTS

| | | | | |
|---|---|---|---|---|
| 2018/0264994 A1* | 9/2018 | Stoehr | .................... | F21S 41/285 |
| 2018/0306959 A1* | 10/2018 | Schwaiger | ........... | B60Q 1/0088 |
| 2019/0299853 A1* | 10/2019 | Fleurence | ................ | F21V 5/008 |
| 2019/0338930 A1* | 11/2019 | Spinger | ................... | G02B 7/028 |
| 2020/0003381 A1* | 1/2020 | Liao | ......................... | F21S 41/24 |
| 2020/0072428 A1* | 3/2020 | Simchak | ................ | F21S 41/148 |
| 2020/0116323 A1* | 4/2020 | Nykerk | ................. | F21S 41/285 |
| 2020/0132268 A1* | 4/2020 | Zhang | .................. | F21S 41/663 |
| 2020/0149701 A1* | 5/2020 | Monestier | ............. | F21S 41/322 |

FOREIGN PATENT DOCUMENTS

| | | |
|---|---|---|
| EP | 2884157 A2 | 6/2015 |
| WO | 2017157706 A1 | 9/2017 |
| WO | 2018065278 A1 | 4/2018 |

* cited by examiner

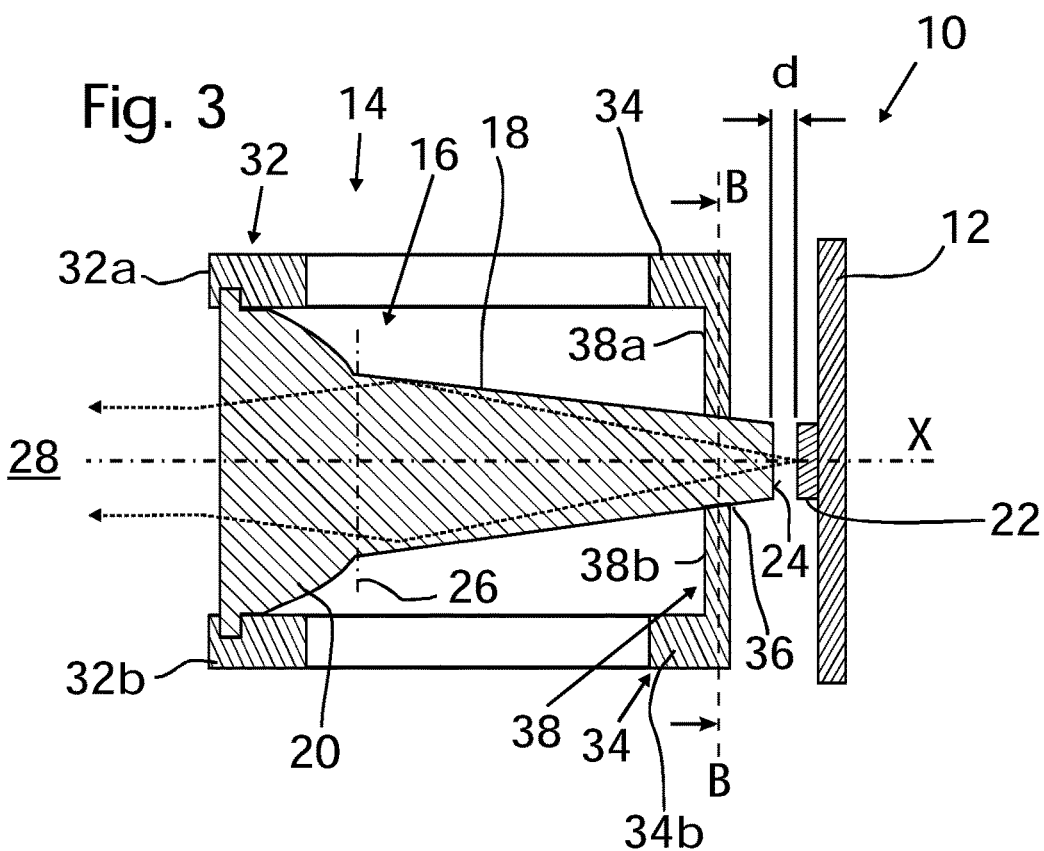
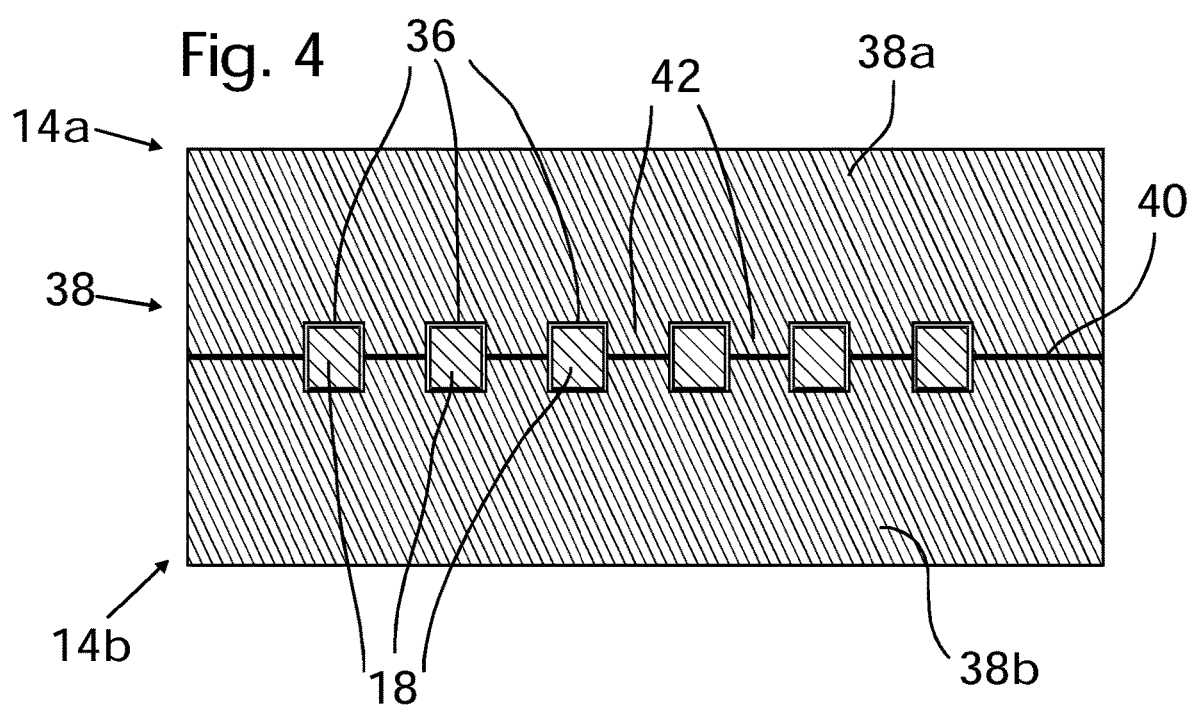

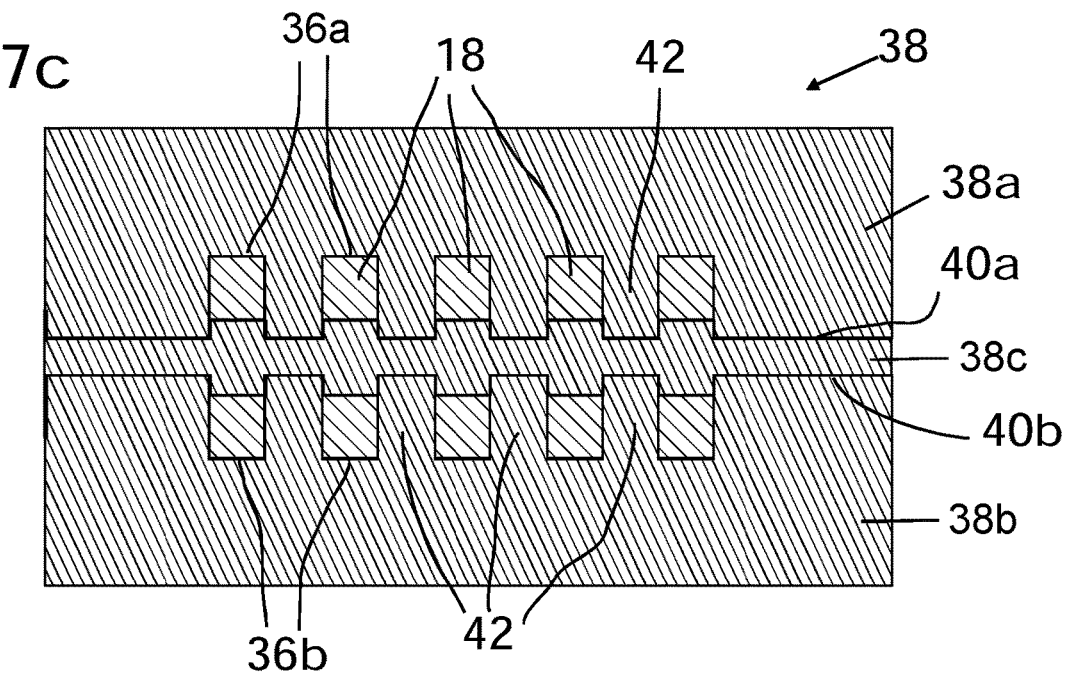
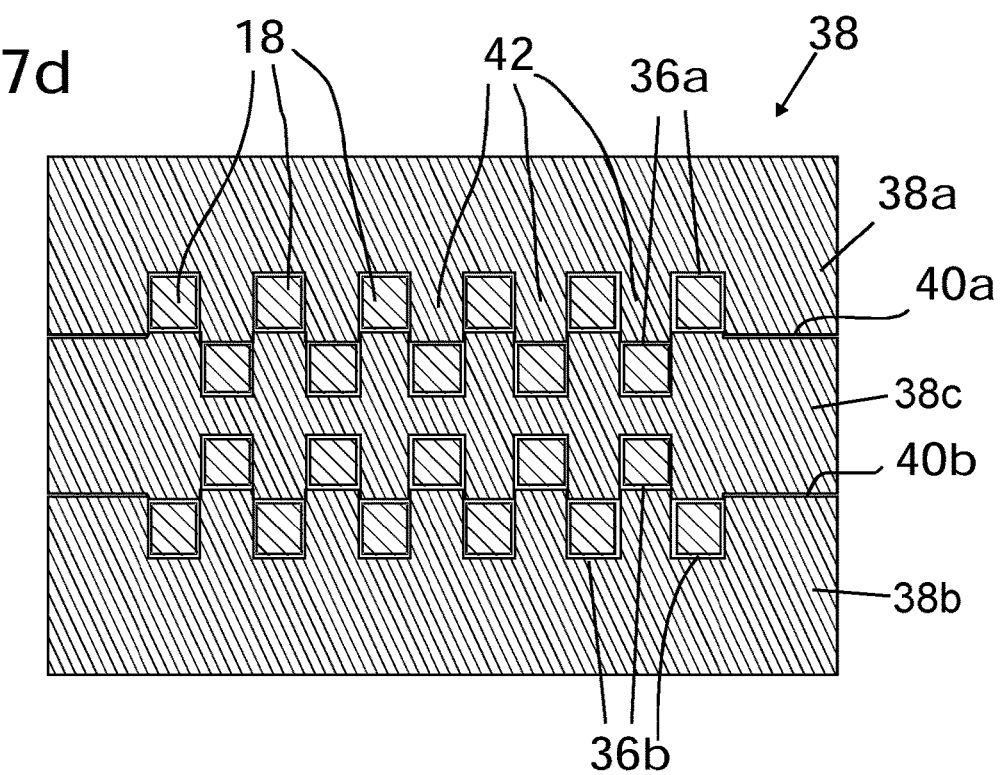

HOLDING COLLIMATOR ELEMENTS IN A LIGHTING ARRANGEMENT

CROSS REFERENCE TO RELATED APPLICATIONS

This application claims the benefit of European Patent Application No. 19171105.0 filed on Apr. 25, 2019, the contents of which are hereby incorporated by reference herein.

FIELD

The disclosure relates to the field of lighting, and more specifically to a lighting arrangement and to a method of manufacturing a lighting arrangement. In particular, embodiments of the disclosure relate to a lighting arrangement including a plurality of light sources in spaced arrangement and a plurality of collimator elements arranged in front of the light sources.

BACKGROUND

Lighting arrangements including a plurality of light sources and collimator elements in spaced arrangement can be used to obtain a variable beam of light, in particular for illumination purposes. The intensity distribution of light emitted from such a lighting arrangement may be modified by controlled operation of the individual light sources.

Lighting arrangements of the above discussed type may be used e.g. in automotive lighting, especially in automotive headlamps, in particular for adaptive driving beam (ADB).

SUMMARY

The positioning of optical elements, such as collimator elements, relative to the light sources may greatly influence the resulting beam. One or more embodiments provide a lighting arrangement and manufacturing method which easily allows exact positioning of the elements.

The lighting arrangement according to embodiments of the disclosure includes a plurality of light sources in spaced arrangement. While the light sources may in principle be of any type, LED lighting elements are preferred. The term "LED lighting element" should be understood to comprise any type of solid state lighting element, such as e.g. light emitting diodes, organic light emitting diodes (OLED), laser diodes, etc. An LED lighting element may comprise a single or a plurality of such lighting elements arranged in close proximity. For ease of reference, an optical axis may be defined for at least one of the light sources directed into a main light emission direction. In the case of a flat light emitting surface of an LED, the optical axis may be defined in the center of the surface and directed into a normal direction to the surface. Optical axes for at least some, and in specific embodiments, all light sources may be arranged at least substantially in parallel.

The term "spaced arrangement" should be understood to refer to the light sources being arranged over a region with a size, at least in one direction, which is larger than the combined sizes of the individual light sources. At least some, and in specific embodiments, all light sources may be arranged at a distance from one or more neighboring light sources. At least some of the light sources may in specific embodiments be spaced from each other in a traverse direction, at least substantially perpendicular to an optical axis. The distance between light sources, measured between neighboring edges of light emitting portions, may in some embodiments correspond to more than 20%, specifically more than 50% of the size of the light sources in the same direction.

A plurality of collimator elements are arranged in front of the light sources, i.e. such that light emitted from the light sources is received by the collimator elements. A collimator element may be understood to be any type of optical element which receives light with a first spatial emission characteristic, such as e.g. an opening angle, and emits light with a second, different spatial emission characteristic, which is narrower than the first. In particular, the collimator elements may be TIR (total internal reflection) elements, i.e. solid elements made of transparent material. The collimator elements are in specific embodiments in spaced arrangement, i.e. arranged at a distance from each other, in more specific embodiments in a traverse direction. In specific embodiments, an equal number of light sources and collimator elements may be provided such that light emitted from each light source is collimated by a corresponding collimator element.

A holder is provided to hold the collimator elements. The holder comprises a plurality of spaced openings, such that the collimator elements may be arranged within the openings to be held in place. In specific embodiments, the collimator elements may be surrounded by the holder in at least one holding plane, which may be arranged perpendicular to an optical axis.

The collimator elements, which in specific embodiments are elongate elements, for example, extend along an optical axis, are held within the openings. The openings may have any shape suited to hold the collimators, such as e.g. circular or, specifically, rectangular. To achieve a secure hold and precise positioning, the openings may be sized and shaped to closely conform to the outer dimensions of the collimator elements, at least in the holding plane. According to embodiments of the disclosure, the openings are arranged to contact the collimator elements from at least two opposed sides. Furthermore, it may be possible, that the openings are even arranged to contact the collimator elements from four sides.

According to the embodiments of the disclosure, the holder may comprise at least a first and a second portion and at least some, in specific embodiments all of the openings may be formed between the first and the second portion. The first and second portion of the holder may be separated by a division where two surfaces are arranged in contact or close proximity with a small gap. While in the finished lighting arrangement the first and second portion of the holder are in specific embodiments fixed relative to each other, the first and second portion may be formed by separate bodies, even though they may be made out of the same material. During manufacture of the holder and/or lighting arrangement, the holder may be assembled by joining at least the first and second portion. In the finished holder and/or lighting arrangement, the first and second portion may be fixed relative to each other e.g. by a material connection such as by welding or gluing, or by a mechanical connection, such as clamping.

Thus, while the openings in the assembled holder may in specific embodiments be closed around the collimator elements, at least some of the bordering portions of the openings (e.g. the edges of the openings) may be provided as parts of the first and/or the second portion of the holder, such that the openings are completed after the first and second portion are joined. For example, partial openings may be provided in the first and/or second portion of the holder to form complete openings as the first and second portion are arranged on top of each other. The term "partial opening" may be understood in comparison to an opening provided in the assembled holder e.g. as an opening only partially surrounded, e.g. by edges on three sides.

Providing the holder with a first and a separate second portion allows to easily arrange the collimator elements to be held within the opening. In order to position the collimator elements within the openings, they may be arranged between the first and the second portion of the holder, which may in one manufacturing step be arranged at a distance to each other. As the portions are joined in a subsequent manufacturing step, the holder may be completed to hold the collimator elements within the openings.

Providing a holder with openings, in particular surrounding the individual collimator elements, allows to achieve an exact and defined arrangement of the collimator elements, which facilitates an exact relative arrangement of light sources and collimator elements. By providing the holder to be comprised of at least two separate portions, the lighting arrangement may easily be manufactured without requiring the collimator elements to be threaded through the individual openings.

In a specific embodiment, the first and/or the second portion of the holder may be provided with a plurality of spaced, projecting wall elements. In the holder as finally assembled, the wall elements may separate the collimator elements. The wall elements may be therefore form part of bordering portions of the first and/or second portions, i.e. those parts which contact the collimator elements. The wall elements are in specific embodiments spaced to leave partial openings in between, which could be described as a toothed arrangement. For example, a partial opening may be formed in one holder portion between two neighboring wall elements and a connecting part of the respective holder portion to surround the opening from three sides. When joining the first and second portions of the holder, the partial opening may be completed to form a complete opening, e.g. surrounded from the fourth side by a part of the other holder portion.

The openings in the holder, and likewise the collimator elements and/or light sources, may be provided in different arrangements, such as e.g. in at least one line (or row), in specific embodiments extending in traverse direction. In some embodiments, a matrix arrangement may be formed comprising a plurality of rows arranged at least substantially in parallel. The openings in adjacent rows of a matrix arrangement may be provided in aligned arrangement, i.e. in columns at least substantially perpendicular to the rows. Also, the openings of adjacent rows may be arranged in offset arrangement, which may be preferable to form separate rows of openings between only two holder portions.

It should be understood that the holder may comprise more than two portions. In one embodiment, the holder may comprise at least a third portion in addition to the first and second portions. For example, a first group of openings may be arranged between the first and second portions, and a second group of openings may be arranged between the second and third portions. Each of the first and/or second group of openings may be arranged to form a row of openings. A holder comprising more than two portions may be in particular preferable if at least two rows of openings are formed at least substantially in parallel, in particular, three or more rows.

The openings may be arranged at a distance from the light sources. The distance may e.g. correspond to less than 50% of a length of a collimator element along an optical axis, more specifically, less than 30% of the length, and even more specifically less than 20%.

According to one embodiment, the holder may preferable comprise a plate portion arranged in a holding plane. The plate portion and holding plane may in specific embodiments extend at least substantially perpendicular to an optical axis. The holding plane may be arranged at a distance to the light source, which distance in some embodiments is less than a length of the collimator element along the optical axis, for example, less than 50% of the length, and in specific embodiments less than 20%. The plate portion is in some embodiments of limited thickness extending in parallel to the optical axis. For example, the thickness may correspond to less than 40% of the length of a collimator element, for example, less than 20%. A rather thin plate portion may provide for a small area of contact between the holder and the collimator elements, which minimizes light loss, e.g. due to a disturbance of total internal reflection properties at the contact area.

In a specific embodiment, the collimator elements may be of elongated shape, in particular extending along an optical axis. The extension of the collimator elements in traverse direction is in specific embodiments substantially less than the extension in longitudinal direction, such as e.g. less than 50%, in specific embodiments 30% or less. The collimator elements may be shaped to get larger in traverse direction with increasing distance from the light source, such that an area of a second cross-section of the collimator elements is larger than an area of a first cross-section, if the first cross-section is arranged closer to the light sources. The shape of the cross-sections may be of any type, preferable at least substantially rectangular (which may be understood such that the edges may be rounded). The collimator elements may be e.g. at least substantially of conical or pyramidal frustum shape.

Preferable, the light sources may be arranged on a carrier, e.g. a flat, plane carrier such as a circuit board. The holder may in specific embodiments be fixed to the carrier. This allows to obtain secure and precise positioning of the holder and of the collimator elements held within the holder relative to the light sources. Matching positioning elements may be provided on the holder and/or on the carrier, such as e.g. protrusions to be received in corresponding openings, to ensure exact positioning. The holder may be fixed to the carrier e.g. by material connection such as by gluing or welding, or by mechanical connection, e.g. via connection elements such as screws, clamps etc.

In specific embodiments, at least one lens element may be provided to project light emitted from the collimator elements. The one or more lenses may be provided in one piece with one or more of the collimator elements. In specific embodiments, a plurality of collimator elements, more specifically all collimator elements, may be formed in one piece with a lens element. The holder may be arranged to hold the lens, e.g. by enclosing it in one or more lens openings. The lens opening or lens openings may be formed between the first and second portion, which ensures an easy arrangement of the lens within the lens opening.

These and other aspects of the disclosure will be apparent from and elucidated with reference to the embodiments described hereinafter.

BRIEF DESCRIPTION OF THE DRAWINGS

In the drawings:

FIG. 3 shows a sectional view of the lighting arrangement of FIG. 1, FIG. 2 with the section along A . . . A in FIG. 2;

FIG. 4 shows a sectional view of the lighting arrangement of FIG. 1-3 with the section along B . . . B in FIG. 3;

FIG. 7a-d show sectional views similar to FIG. 4 for different embodiments of lighting arrangements.

DETAILED DESCRIPTION OF EMBODIMENTS

Figure 1:
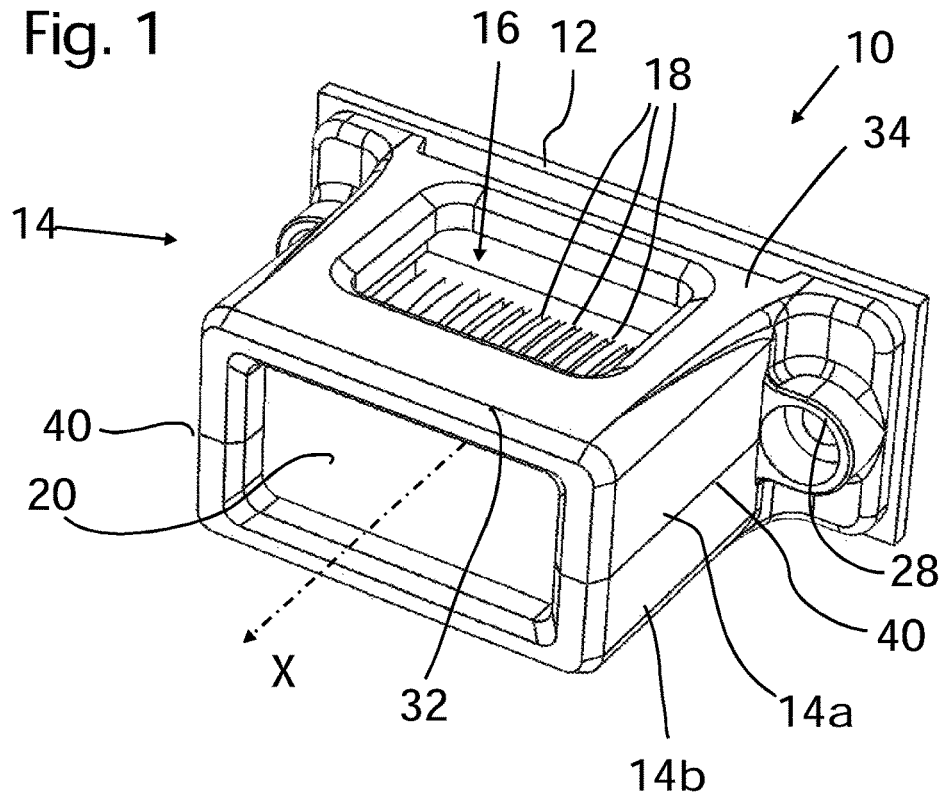
FIG. 1 shows a perspective view of an embodiment of a lighting arrangement including a carrier.
Figure 2:
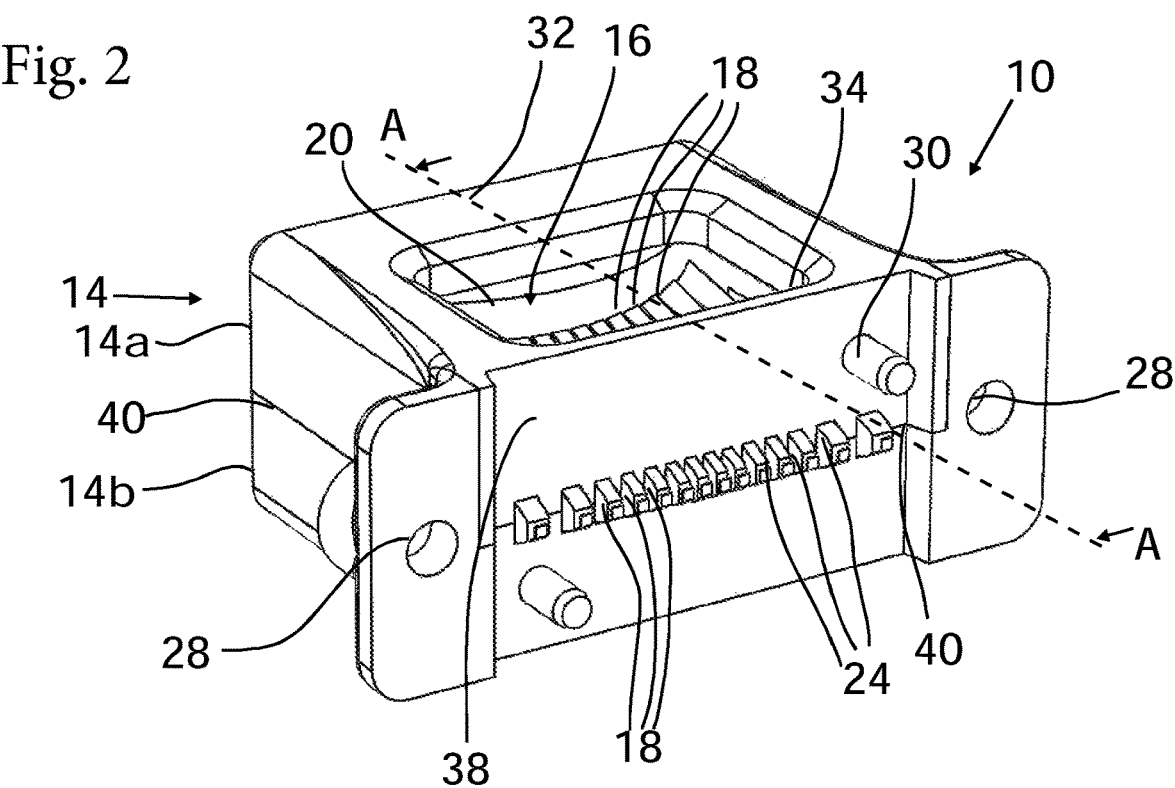
FIG. 2 shows a perspective view of a backside of the lighting arrangement of FIG. 1 without the carrier.

FIG. 1, FIG. 2 show in perspective views a lighting arrangement 10 including a carrier 12, a holder 14 mounted on the carrier 12, and an optical unit 16 held inside the holder 14.

The optical unit 16 is comprised of individual elongate collimator elements 18 extending in the direction of an optical axis X and a lens 20. As will become apparent, several optical axes arranged in parallel may be defined for each collimator element. For ease of reference, one centrally arranged optical axis X will be referred to here. The collimator elements are arranged in parallel in spaced arrangement, i.e. at a distance to each other in a traverse direction, perpendicular to the optical axis X.

In the embodiment shown, the lens 20 and collimator elements 18 are formed in one piece out of a solid, transparent material, for example, silicone.

A plurality of LED elements as light sources 22 (shown e.g. in FIG. 5, not visible in FIG. 1, 2) are mounted on the carrier 12 arranged in a line, or row, extending perpendicular to the optical axis X.

The arrangement of one light source 22 is visible from the sectional view of FIG. 3. The optical unit 16 including the collimator element 18 is arranged in front of the light source 22 such that light emitted from the light source 22 is received at a receiving surface 24 of the collimator element 18.

The receiving surface 24 is of rectangular shape. The shape of the collimator element 18 may be described substantially as a pyramidal frustum extending between the receiving surface 24 and a rectangular light emitting portion 26. In the embodiment shown, the optical unit 16 with the collimator element 18 and lens 20 is formed in one piece such that the light emitting portion 26 is not separately visible. The collimator element 18 is shaped to widen with increasing distance from the light source 22 such that a second cross-section at a position distant from the light source 22, such as at the light emitting portion 26, is larger than a first cross-section closer to the light source 22, such as at the receiving surface 24.

The collimator element 18 is a TIR reflector. Light received at the receiving surface 24 propagates internally within the transparent material of the collimator element 18. At the boundary surfaces to the surrounding air, total internal reflection occurs, as indicated for selected beams of light in FIG. 3. In consequence, the light emitted from the light source 22 broadly (Lambertian emitter) is collimated, i.e. the opening angle thereof reduced by the collimator element 18. The collimated light is then projected by the lens 20 as an emitted beam 28.

As shown in FIG. 3, the collimator element 18 is arranged at a small distance d in front of the LED light source 22.

While it is possible to arrange the light receiving surface 24 of the collimator 18 to directly contact the light emitting surface of the LED light source 22, it is preferable to provide a gap as shown in FIG. 3. However, the width d of the gap is in specific embodiments small, such as e.g. 50 µm.

The optical unit 16 is held in front of the LED light sources 22 by the holder 14. As visible in particular from FIG. 3, the holder 14 encloses both the lens 20 and the individual collimator elements 18 to secure them in place relative to the carrier 12 and light sources 22. As visible e.g. from FIG. 1, FIG. 2, the holder 14 comprises screw holes to provide a screw connection to the carrier 12. Further, as shown in FIG. 2, the backside of the holder 14 comprises positioning protrusions 30 which fit into corresponding positioning holes in the carrier 12 (not shown) and ensure correct positioning of the holder 14 relative to the carrier 12 and light sources 22.

The optical unit 16 is held within the holder 14, which comprises a front frame 32 surrounding and receiving the outer edges of the lens 20 in form-fitting manner (see FIG. 3). Further, the holder 14 comprises a back frame 34 in which the collimator elements 18 are held. The back frame 34 comprises a plurality of spaced openings 36 provided in a holding plate 38 arranged in a holding plane B . . . B.

As visible from FIG. 3, the holding plate 38 and holding plane B . . . B are arranged at a distance along the optical axis X both from the light source 22 and from the receiving surface 24 of the collimator element 18. Thus, the back ends of the collimator elements 18 project from the holding plate 38 (FIG. 2).

FIG. 4 shows a sectional view of the holding plane B . . . B. Collimator elements 18 are arranged within the openings 36 formed in the holding plate 38. As shown, the collimator elements 18 are surrounded by bordering portions of the openings 36 which contact the outer surfaces of the collimator element 18 to hold it securely in place.

In the first embodiment shown, the holder 14 is comprised of two separate portions, a first, upper portion 14a and a second, lower portion 14b. A separation 40 between the first and second portions 14a, 14b is arranged mainly horizontally, i.e. in parallel to the row of light sources 22.

The front frame 32 of the holder 14 is comprised of an upper front frame element 32a and a lower front frame element 32b which are joined together to form the front frame element 32 enclosing the lens 20. Likewise, the back frame 34 is separated into a first, upper back frame 34a to which a first, upper portion 38a of the holding plate 38 is attached and a second, lower back frame portion 34b, to which a second, lower portion 38b of the holding plate 38 is attached.

The holder 14, which is arranged to accommodate the optical element 16 and in particular the collimator elements 18 inside, is therefore formed by two separate first and second portions 14a, 14b which are joined together, e.g. mechanically such as by clamping and/or screw connection, or by a material connection such as gluing, welding, etc.

As shown e.g. in FIG. 2, FIG. 4, the separation surface 40 along which the first and second portions 14a, 14b, and in particular also the first and second portions 38a, 38b of the holding plate 38 are joined, is arranged in contact with each of the openings 36. Thus, the bordering portions surrounding the openings 36 are partially provided in the first portion 38a of the holding plate 38, and for the remaining part in the second portion 38b of the holding plate 38.

In the first embodiment as shown in FIG. 4, the partial openings for each portion 38a, 38b are formed by projecting wall elements 42 in spaced arrangement, such that the partial openings are formed in between the wall elements 42. As visible in particular from FIG. 5, the first and second portion 38*a*, 38*b* of the holding plate 38 thus comprise a toothed arrangement.

Figure 5:
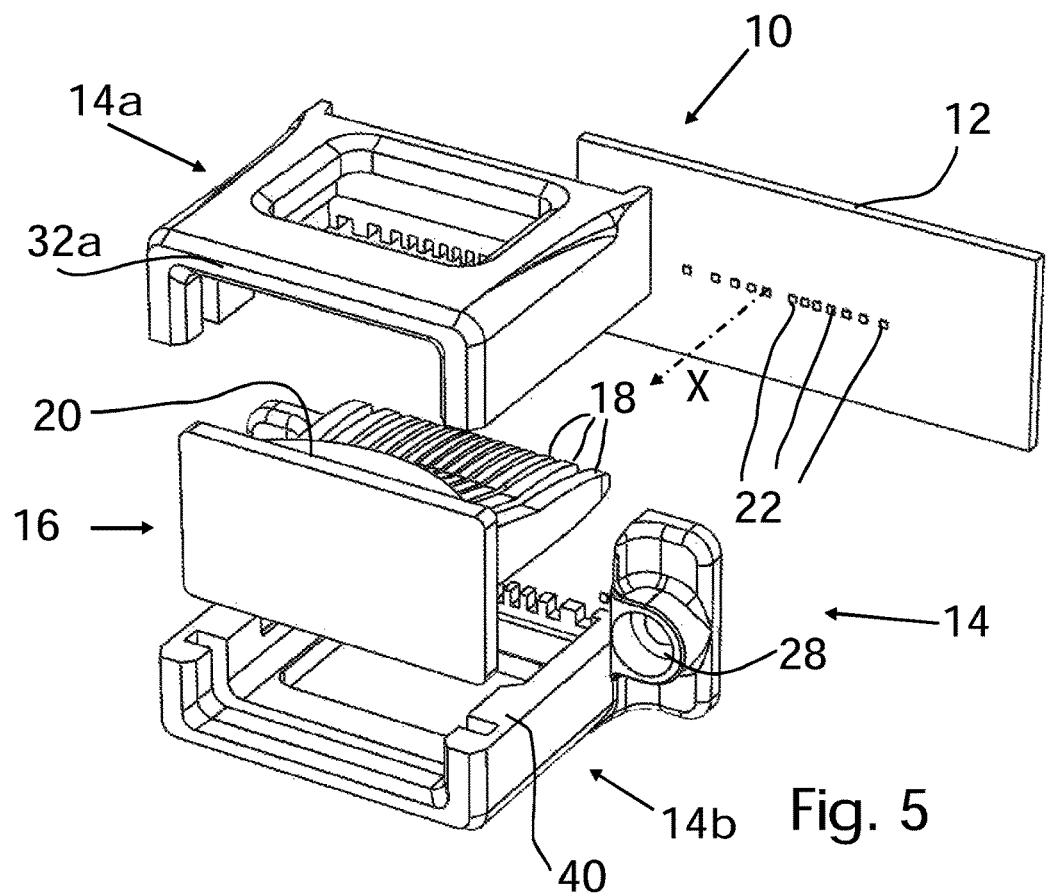
FIG. 5 shows the lighting arrangement of FIG. 1-4 in a perspective, exploded view.
Figure 6:
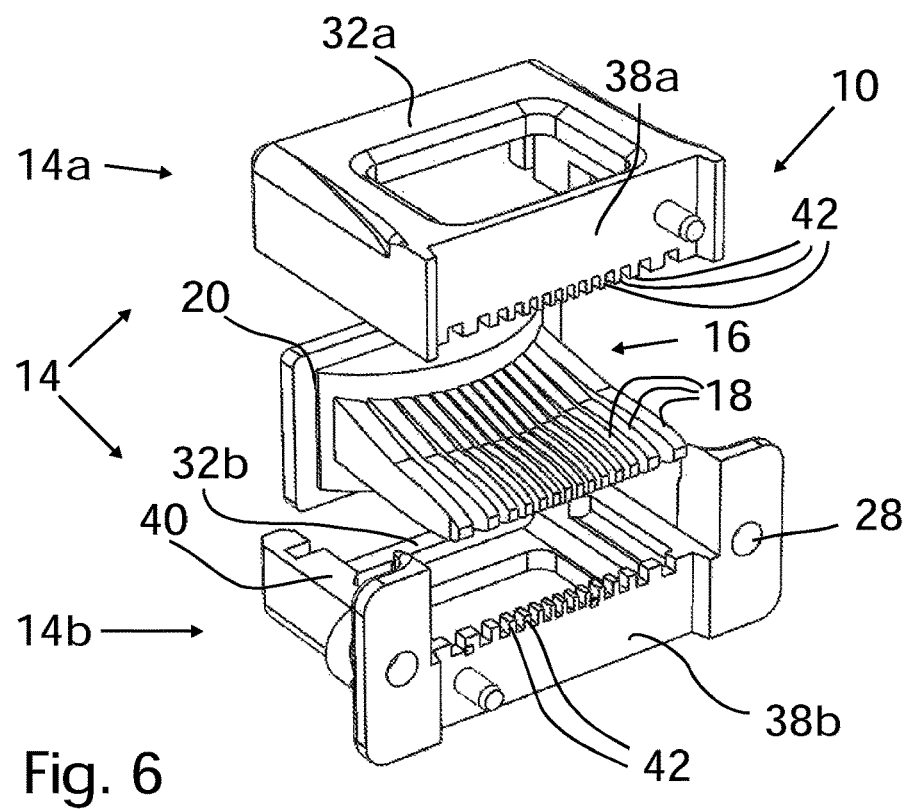
FIG. 6 shows the lighting arrangement of FIG. 1-5 in a perspective, exploded view from a backside, without the carrier.

The exploded views of FIG. 5, FIG. 6 demonstrate how the separation of the first and second portions 14*a*, 14*b* of the holder 14 allows arrangement of the optical unit 16 within the holder 14:

During assembly of a lighting unit 10, the first and second portions 14*a*, 14*b* of the holder 14 are in one manufacturing step arranged separately at a distance from each other. The optical unit 16 may than be easily arranged in between the first and second portions 14*a*, 14*b* of the holder 14. For example, the optical unit 16 may first be fitted into the lower, second portion 14*b*, such that the edges of the lens 20 are received within the lower portion 32*b* of the front frame 32 and that the collimator elements 18 may be arranged within the partial openings between the projecting wall portions 42 of the lower, second portion 38*b* of the holding plate 38.

Then, the second portion 14*b* of the holder 14 may be joined to the first portion 14*a*, such that the front frame 32, back frame 34 and holding plate 38 are completed and fully enclose the lens 20 and collimator elements 18 of the optical unit 16.

Finally, the holder 14 may be mounted to the carrier 12.

In the resulting lighting arrangement 10, the collimator elements 18 are securely held and exactly positioned relative to the light sources 22 to maintain an exact distance d and minimize offset between the light sources 22 and receiving services 24. The collimator elements 18 are entirely surrounded in the holding plane B . . . B from all four sides by the bordering portions of the openings 36. The thickness of the holding plate 38 is relatively small compared to the length of the collimator elements 18, such that there is minimal disturbance of total internal reflection. The holder 14 contacts the optical unit 16 only in the region of the front frame 32 and holding plate 38, whereas the remaining portion of the optical unit 16 is not in contact with the holder 14 such that there is minimal light loss.

The holding plate 38 is arranged closer to the receiving surface 24 than to the light emitting portion 26 of the collimator element 18, i.e. the collimator elements 18 are held within the openings 36 close to their back ends.

It should be noted that the arrangement of the light sources 22 in a line and the division surface 40 between the first and second portions 14*a*, 14*b* of the holder 14 as shown in FIG. 4 are only examples of possible embodiments. In further embodiments, the light sources 22 may be arranged differently on the carrier 12, such as e.g. in a matrix configuration with rows and columns. Likewise, the collimator elements 18 may be provided not only in one line as in the first embodiment, but for example in two, three or more lines, or rows, corresponding to the arrangement of the light sources 22.

FIG. 7*a*-7*d* illustrate the arrangement of collimator elements 18, openings 36 and the division surface 40 within the holding plate 38 for different embodiments.

Figure 7A:
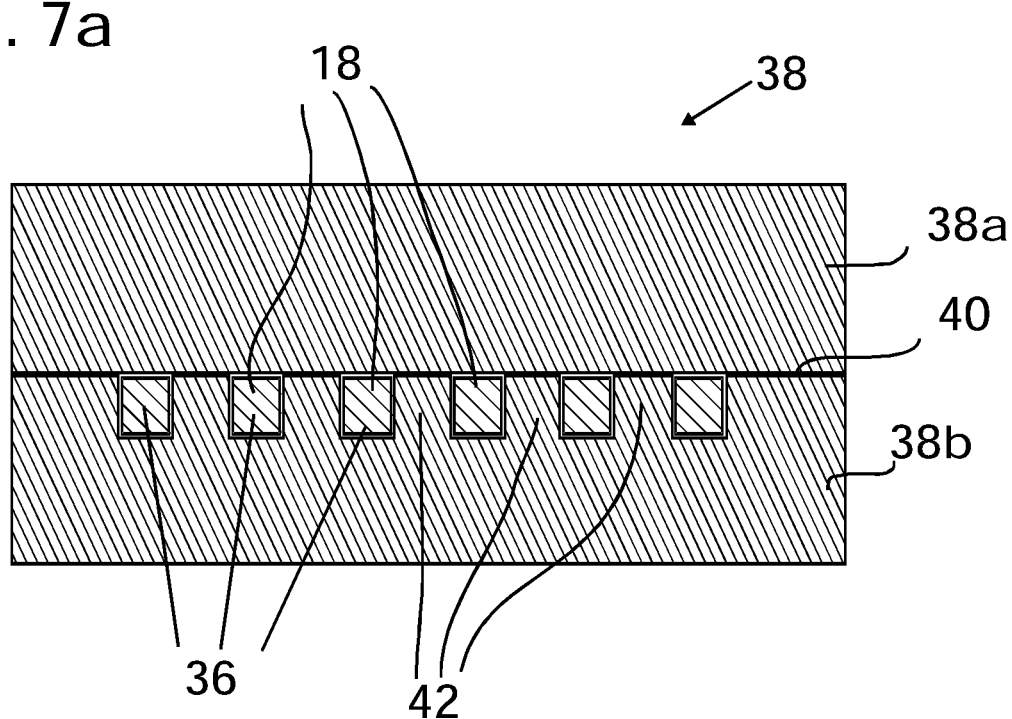

In a second embodiment according to FIG. 7*a*, a toothed arrangement of protruding wall elements 32 is formed only in the lower, second portion 38*b* of the holding plate 38, whereas the upper portion 38*a* of the holding plate 38 has a straight edge. Thus, partial openings with three bordering portions are formed in the second portion 38*b*, to be closed off by the edge of the first portion 38*a* once the first and second portions 38*a*, 38*b* are joined.

Figure 7B:
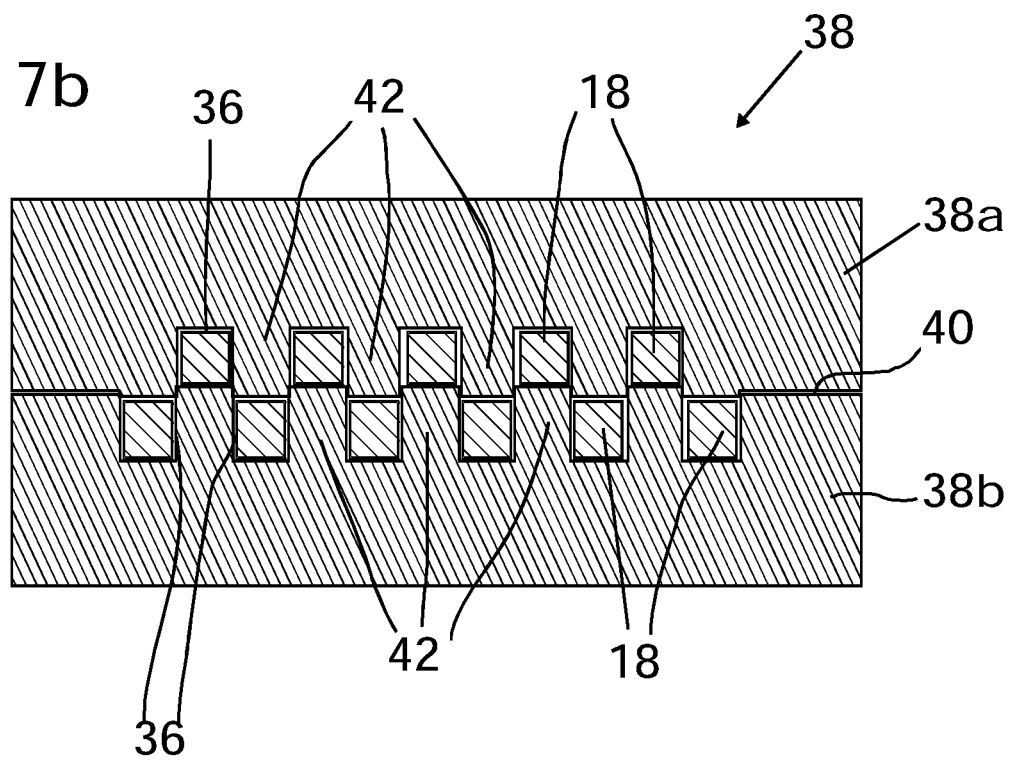

In a third embodiment according to FIG. 7*b*, the collimator elements 18 are arranged in not only one row, but two rows in offset arrangement. Both the first and second portions 38*a*, 38*b* of the holding plate 38 are provided with toothed arrangements of projecting wall elements 42, albeit in alternating offset arrangement such that alternatingly openings 36 are bordered from three sides in one portion and closed off to the fourth side by the other portion of the holding plate 38. The light sources 22 on the carrier 12 (not shown for the second embodiments) are arranged in accordance with the arrangement of the collimator elements 18, i.e. in two rows in offset arrangement.

In each of the fourth and fifth embodiments of FIG. 7*c*, 7*d*, a holder 14 is comprised of three portions, of which the first comprises a first, upper portion 38*a* of the holding plate 38, the second comprises a second, lower portion 38*b* of the holding plate 38, and the third comprises a third, center portion 38*c* of the holding plate 38.

In the fourth embodiment (FIG. 7*c*), the collimator elements 18 are arranged in a matrix arrangement with rows and columns. A first group of openings 36*a* is formed between the first and third portions 38*a*, 38*c* of the holding plate 38 and a second group 36*b* of openings is formed between the second portion 38*b* and third portion 38*c* of the holding plate 38.

In the fifth embodiment (FIG. 7*d*), four rows of collimator elements 18 are provided. A first group of openings 36*a* for the collimator elements 18 is provided between the first and third portions 38*a*, 38*c* of the holding plate 38 and a second group of openings 36*b* is provided between the second portion 38*b* and third portion 38*c* of the holding plate 38.

It should be noted that the above-mentioned embodiments illustrate rather than limit the disclosure, and that those skilled in the art will be able to design many alternative embodiments without departing from the scope of the appended claims.

In the claims, any reference signs placed between parentheses shall not be construed as limiting the scope. The word "comprising" does not exclude the presence of elements or steps other than those listed in a claim. The word "a" or "an" preceding an element does not exclude the presence of a plurality of such elements.

In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting arrangement, including
   a plurality of light sources in spaced arrangement;
   a first plurality of collimator elements in front of the light sources arranged in a first collimator element row;
   a second plurality of collimator elements in front of the light sources arranged in a second collimator element row;
   a lens formed in one piece with the first and second pluralities of collimator elements, the lens being configured to project collimated light as a single beam; and
   a holder with a plurality of spaced openings, the first and second pluralities of collimator elements being arranged to be held within the openings, in such a way that the openings are arranged to contact the collimator elements from at least two opposed sides,
   the holder comprising at least a first portion and a second portion, at least some of the openings being formed between the first and the second portion;
   wherein a first group of the openings is arranged in a first opening row to receive the first collimator element row, and a second group of the openings is arranged in a second opening row to receive the second collimator element row, the second opening row being arranged at least substantially in parallel and at a distance to the first opening row, and the openings of the first and second group are arranged in offset arrangement.

2. The lighting arrangement according to claim 1, wherein the light sources are arranged on a carrier, and the holder being fixed to the carrier.

3. The lighting arrangement according to claim 2, wherein the holder and/or the carrier comprise positioning elements to obtain a fixed relative arrangement.

4. The lighting arrangement according to claim 1, wherein at least the first and/or the second portion is provided with a plurality of spaced, projecting wall elements, and wherein the openings are at least partially provided between the wall elements.

5. The lighting arrangement according to claim 1, wherein the holder comprises a third portion, wherein a first group of openings is arranged between the first and third portions, and a second group of openings is arranged between the second and third portions.

6. The lighting arrangement according to claim 1, wherein the holder comprises a plate portion arranged in a holding plane.

7. The lighting arrangement according to claim 1, wherein the openings are arranged at a distance from the light sources.

8. The lighting arrangement according to claim 1, wherein the first and second collimator elements are of elongated shape, and wherein an area of a second cross-section of the first and second collimator elements is larger than an area of a first cross-section of the first and second collimator elements, the first cross-section being arranged closer to the light sources than the second cross-section.

9. The lighting arrangement according to claim 1, wherein the collimator elements are solid elements of a transparent material.

10. The lighting arrangement according to claim 1, wherein the holder is arranged to hold the lens.

11. A method of manufacturing a lighting arrangement, the method comprising:
arranging a plurality of light sources in a spaced arrangement;
arranging first and second collimator element rows comprising first and second pluralities of collimator elements, respectively, in front of the light sources, all of the first and second pluralities of collimator elements being formed in one piece with a lens that is configured to project collimated light as a single beam;
arranging the first and second pluralities of collimator elements between first and second portions of a holder comprising a plurality of spaced openings being formed between the first and second portions in such a way that the openings are arranged to contact the collimator elements from at least two opposed sides;
arranging a first group of the openings in a first opening row to receive the first collimator element row, and a second group of the openings in a second opening row to receive the second collimator element row, the second opening row being arranged at least substantially in parallel and at a distance to the first opening row, and the openings of the first and second group are arranged in offset arrangement.

12. The method according to claim 11, wherein
the holder comprises a third portion, wherein a first group of openings is arranged between the first and third portions, and a second group of openings is arranged between the second and third portions.

13. The method according to claim 11, wherein the holder is arranged to hold the lens.

* * * * *